(12) United States Patent
Russell

(10) Patent No.: US 10,553,380 B2
(45) Date of Patent: Feb. 4, 2020

(54) DUAL SWITCHED CIRCUIT

(71) Applicant: Wesley Russell, Memphis, TN (US)

(72) Inventor: Wesley Russell, Memphis, TN (US)

( * ) Notice: Subject to any disclaimer, the term of this patent is extended or adjusted under 35 U.S.C. 154(b) by 66 days.

(21) Appl. No.: 15/996,493

(22) Filed: Jun. 3, 2018

(65) Prior Publication Data

US 2019/0371550 A1 Dec. 5, 2019

(51) Int. Cl.
*H01H 47/00* (2006.01)
(52) U.S. Cl.
CPC .................... *H01H 47/00* (2013.01)
(58) Field of Classification Search
CPC ...................................... H01H 47/00
See application file for complete search history.

(56) References Cited

U.S. PATENT DOCUMENTS

| 4,514,619 A * | 4/1985 | Kugelman | B64D 15/14 |
| | | | 219/202 |
| 4,933,798 A * | 6/1990 | Widmayer | H02M 5/293 |
| | | | 315/248 |
| 2017/0344178 A1* | 11/2017 | Vekhter | G06F 3/0416 |

* cited by examiner

*Primary Examiner* — Hal Kaplan
*Assistant Examiner* — Terrence R Willoughby
(74) *Attorney, Agent, or Firm* — David J. Kreher

(57) ABSTRACT

The present disclosure reveals a dual switched circuit for turning an electrical device on and off at set intervals of on and set intervals of time so that current is sent to the electrical device for a designated period of time, followed by the interruption of the flow of current to the electrical device for the designated period of time, and so that this pattern can be repeated over and over again.

9 Claims, 2 Drawing Sheets

FIG. 1
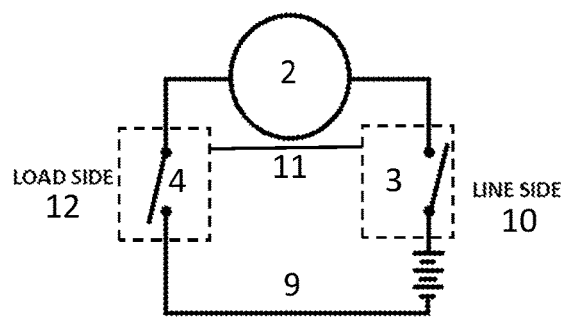
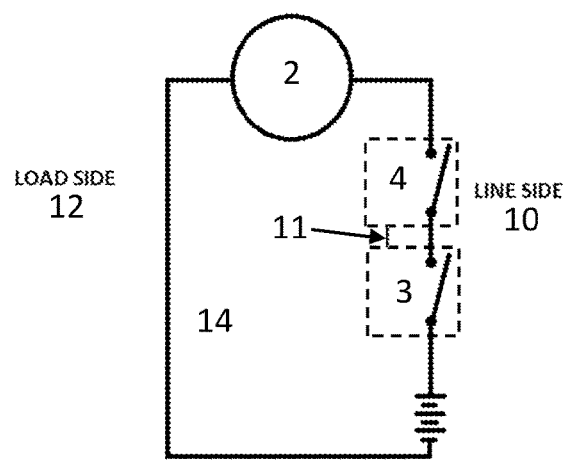
FIG. 3
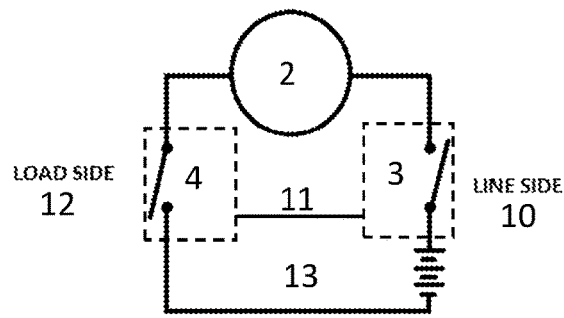
FIG. 2

DUAL SWITCHED CIRCUIT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

Electrical devices operate with the use of switches to control when the electrical device is turned on or off. In some circumstances, it is appropriate to be able to control how long an electrical device is turned on, how long the electrical device is turned off, and to be able to alternate between the two in a cyclical pattern. The present disclosure reveals a dual switched electrical circuit that controls how long an electrical device is on and how long an electrical device is of, in a cyclical pattern.

Background of the Invention

Cyclical timers are common in the electrical industry. The present disclosure is an alternative apparatus for the creation of a cyclical timer.

SUMMARY OF THE INVENTION

The present disclosure reveals a dual switched circuit for controlling how long current is supplied to an electrical device and how long current is prevented from flowing to an electrical device, wherein this sequence can be repeated, with a first switch and a second switch.

In the first embodiment, the first switch is attached to the line side of an electrical device and comprises a first timer and a first controller to set the timer. The second switch is attached to the load side of a device and comprises a second timer and a second controller to set the timer. The first timer is used to set the duration the switches are closed and the second timer is used to set the duration the switches are open.

In the second embodiment, the first switch is attached to the load side of a device and comprises a first timer and a first controller to set the timer. The second switch is attached to the line side of a device and comprises a second timer and a second controller to set the timer. The first timer is used to set the duration the switches are closed and the second timer is used to set the duration the switches are open.

In the third embodiment, the first switch is attached to the line side of a device and comprises a first timer and a first controller to set the timer. The second switch is attached to the line side of a device and comprises a second timer and a second controller to set the timer. The first timer is used to set the duration the switches are closed and the second timer is used to set the duration the switches are open.

In any of the embodiments, the timer and switches could be operated mechanically or as an electronic circuit.

BRIEF DESCRIPTION OF THE SEVERAL VIEWS OF THE DRAWING

FIG. 1 is a schematic of the first embodiment of the dual control circuit;

FIG. 2 is a schematic of the second embodiment of the dual control circuit;

FIG. 3 is a schematic of the third embodiment of the dual control circuit

DETAILED DESCRIPTION OF THE INVENTION

Figure 4A:
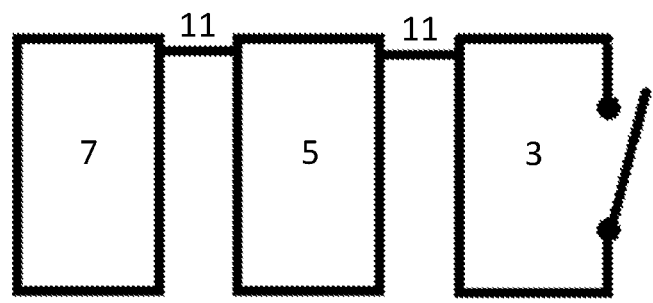
FIG. 4A is a schematic of the internal circuitry of the first switch.
Figure 4B:
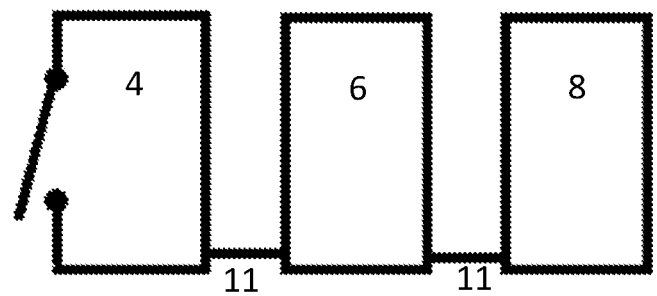
FIG. 4B is a schematic of the internal circuitry of the second switch.

The present disclosure reveals a dual switched circuit 1 for the controlling of a electrical device 2 on a timed on-off loop comprising a first switch 3, a second switch 4, a first timer 5, a second timer 6, a first controller 7, and a second controller 8.

In the first embodiment 9, the first switch 3 is located on the line side 10 of the electrical device 2, comprises the first timer 5 and the first controller 7. The first controller 7 is connected to the first timer 5 by appropriate wiring 11 and the first timer 5 is attached to the first switch 3 by appropriate wiring 11. The first switch 3 is capable of receiving a signal from the first timer 5 that indicates when the first switch 3 should open and wherein the first switch 3 is also able to convey that same signal to the second switch 4 by appropriate wiring 11, whereupon the second switch 4 also opens. The first controller 7 is able to set the interval during which the first timer 5 allows the first switch 3 and the second switch 4 to remain closed and thus allow current to be supplied to the electrical device 2. The second switch 4 is located on the load side 12 of the electrical device 2, comprises the second timer 6 and the second controller 8. The second controller 8 is connected to the second timer 6 by appropriate wiring 11 and the second timer 6 is attached to the second switch 4 by appropriate wiring 11. The second switch 4 is capable of receiving a signal from the second timer 6 that indicates when the second switch 4 should close and wherein the second switch 4 is also able to convey that same signal to the first switch 3 by appropriate wiring 11, whereupon the first switch 3 also closes. The second controller 8 being able to set the interval during which the second timer 6 allows the first switch 3 and the second switch 4 to remain open and thus prevent current from being supplied to the electrical device 2.

In the second embodiment 13, the first switch 3 is located on the load side 12 of the electrical device 2, comprises the first timer 5 and the first controller 7. The first controller 7 is connected to the first timer 5 by appropriate wiring 11 and the first timer 5 is attached to the first switch 3 by appropriate wiring 11. The first switch 3 is capable of receiving a signal from the first timer 5 that indicates when the first switch 3 should open and wherein the first switch 3 is also able to convey that same signal to the second switch 4 by appropriate wiring 11, whereupon the second switch 4 also opens. The first controller 7 is able to set the interval during which the first timer 5 allows the first switch 3 and the second switch 4 to remain closed and thus allow current to be supplied to the electrical device 2. The second switch 4 is located on the line side 10 of the electrical device 2, comprises the second timer 6 and the second controller 8. The second controller 8 is connected to the second timer 6 by appropriate wiring 11 and the second timer 6 is attached to the second switch 4 by appropriate wiring 11. The second switch 4 is capable of receiving a signal from the second timer 6 that indicates when the second switch 4 should close and wherein the second switch 4 is also able to convey that same signal to the first switch 3 by appropriate wiring 11, whereupon the first switch 3 also closes. The second controller 8 being able to set the interval during which the second timer 6 allows the first switch 3 and the second switch 4 to remain open and thus prevent current from being supplied to the electrical device 2.

In the third embodiment 14, the first switch 3 is located on the line side 10 of the electrical device 2, comprises the first timer 5 and the first controller 7. The first controller 7 is connected to the first timer 5 by appropriate wiring 11 and the first timer 5 is attached to the first switch 3 by appropriate wiring 11. The first switch 3 is capable of receiving a signal from the first timer 5 that indicates when the first switch 3 should open and wherein the first switch 3 is also able to convey that same signal to the second switch 4 by appropriate wiring 11, whereupon the second switch 4 also opens. The first controller 7 is able to set the interval during which the first timer 5 allows the first switch 3 and the second switch 4 to remain closed and thus allow current to be supplied to the electrical device 2. The second switch 4 is located on the line side 10 of the electrical device 2, comprises the second timer 6 and the second controller 8. The second controller 8 is connected to the second timer 6 by appropriate wiring 11 and the second timer 6 is attached to the second switch 4 by appropriate wiring 11. The second switch 4 is capable of receiving a signal from the second timer 6 that indicates when the second switch 4 should close and wherein the second switch 4 is also able to convey that same signal to the first switch 3 by appropriate wiring 11, whereupon the first switch 3 also closes. The second controller 8 being able to set the interval during which the second timer 6 allows the first switch 3 and the second switch 4 to remain open and thus prevent current from being supplied to the electrical device 2.

In any embodiment of the dual switched circuit 1, the first timer 5 and the second timer 6 can be either mechanical timers or electronic timers.

What is claimed:

1. A dual switched circuit for the controlling of a electrical device on a timed on-off loop comprising:
   a first switch, a second switch, a first timer, a second timer, a first controller, and a second controller;
   the first switch is located on a line side of the electrical device, comprises the first timer and the first controller, and wherein the first controller is connected to the first timer by appropriate wiring and the first timer is attached to the first switch by appropriate wiring;
   wherein the first switch is capable of receiving a signal from the first timer that indicates when the first switch is open and wherein the first switch is also able to convey that same signal to the second switch by appropriate wiring, whereupon the second switch also opens;
   the first controller being able to set a interval during which the first timer allows the first switch and the second switch to remain closed and thus allow current to be supplied to the electrical device;
   the second switch is located on a load side of the electrical device, comprises the second timer and the second controller, and wherein the second controller is connected to the second timer by appropriate wiring and the second timer is attached to the second switch by appropriate wiring;
   wherein the second switch is capable of receiving a signal from the second timer that indicates when the second switch is closed and wherein the second switch is also able to convey that same signal to the first switch by appropriate wiring, whereupon the first switch also closes; and
   the second controller being able to set a interval during which the second timer allows the first switch and the second switch to remain open and thus prevent current from being supplied to the electrical device.

2. The dual switched circuit of claim 1 wherein the first timer is a mechanical timer and the second timer is a mechanical timer.

3. The dual switched circuit of claim 1 wherein the first timer is an electronic timer and the second timer is an electronic timer.

4. A dual switched circuit for the controlling of a electrical device on a timed on-off loop comprising:
   a first switch, a second switch, a first timer, a second timer, a first controller, and a second controller;
   the first switch is located on a load side of the electrical device, comprises the first timer and the first controller, and wherein the first controller is connected to the first timer by appropriate wiring and the first timer is attached to the first switch by appropriate wiring;
   wherein the first switch is capable of receiving a signal from the first timer that indicates when the first switch is open and wherein the first switch is also able to convey that same signal to the second switch by appropriate wiring, whereupon the second switch also opens;
   the first controller being able to set a interval during which the first timer allows the first switch and the second switch to remain closed and thus allow current to be supplied to the electrical device;
   the second switch is located on a line side of the electrical device, comprises the second timer and the second controller, and wherein the second controller is connected to the second timer by appropriate wiring and the second timer is attached to the second switch by appropriate wiring;
   wherein the second switch is capable of receiving a signal from the second timer that indicates when the second switch is closed and wherein the second switch is also able to convey that same signal to the first switch by appropriate wiring, whereupon the first switch also closes; and
   the second controller being able to set a interval during which the second timer allows the first switch and the second switch to remain open and thus prevent current from being supplied to the electrical device.

5. The dual switched circuit of claim 4 wherein the first timer is a mechanical timer and the second timer is a mechanical timer.

6. The dual switched circuit of claim 4 wherein the first timer is an electronic timer and the second timer is an electronic timer.

7. A dual switched circuit for the controlling of a electrical device on a timed on-off loop comprising:
   a first switch, a second switch, a first timer, a second timer, a first controller, and a second controller;
   the first switch is located on a line side of the electrical device, comprises the first timer and the first controller, and wherein the first controller is connected to the first timer by appropriate wiring and the first timer is attached to the first switch by appropriate wiring;

wherein the first switch is capable of receiving a signal from the first timer that indicates when the first switch is opened and wherein the first switch is also able to convey that same signal to the second switch by appropriate wiring, whereupon the second switch also opens;

the first controller being able to set a interval during which the first timer allows the first switch and the second switch to remain closed and thus allow current to be supplied to the electrical device;

the second switch is located on a line side of the electrical device, comprises the second timer and the second controller, and wherein the second controller is connected to the second timer by appropriate wiring and the second timer is attached to the second switch by appropriate wiring;

wherein the second switch is capable of receiving a signal from the second timer that indicates when the second switch is closed and wherein the second switch is also able to convey that same signal to the first switch by appropriate wiring, whereupon the first switch also closes; and the second controller being able to set a interval during which the second timer allows the first switch and the second switch to remain open and thus prevent current from being supplied to the electrical device.

8. The dual switched circuit of claim 7 wherein the first timer is a mechanical timer and the second timer is a mechanical timer.

9. The dual switched circuit of claim 7 wherein the first timer is an electronic timer and the second timer is an electronic timer.

* * * * *